(12) United States Patent
Hussein et al.

(10) Patent No.: US 9,012,542 B2
(45) Date of Patent: Apr. 21, 2015

(54) SULFUR EXTENDED POLYMER FOR USE IN ASPHALT BINDER AND ROAD MAINTENANCE

(75) Inventors: Ibnelwaleed A. Hussein, Dhahran (SA); Mohammed H. Al Mehthel, Dhahran (SA); Hamad I. Al-Abdul Wahhab, Dhahran (SA); Saleh H. Al Idi, Dhahran (SA); Junaid Saleem Akhtar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 659 days.

(21) Appl. No.: 12/748,939

(22) Filed: Mar. 29, 2010

(65) Prior Publication Data

US 2010/0256265 A1      Oct. 7, 2010

Related U.S. Application Data

(60) Provisional application No. 61/165,847, filed on Apr. 1, 2009.

(51) Int. Cl.
*C08L 95/00* (2006.01)
*C08L 23/32* (2006.01)

(52) U.S. Cl.
CPC *C08L 23/32* (2013.01); *C08L 95/00* (2013.01)

(58) Field of Classification Search
USPC .................. 524/59; 525/354, 330.3, 330.4
See application file for complete search history.

(56) References Cited

U.S. PATENT DOCUMENTS

| | | | |
|---|---|---|---|
| 2,388,169 A * | 10/1945 | McAlevy et al. | 525/330.4 |
| 3,450,667 A | 6/1969 | Kopacki et al. | |
| 3,972,857 A | 8/1976 | Kaizerman et al. | |
| 4,242,246 A | 12/1980 | Maldonado et al. | |
| 4,575,531 A | 3/1986 | Hoyt et al. | |
| 4,686,264 A | 8/1987 | Hoyt et al. | |
| 4,740,322 A | 4/1988 | DiBiase et al. | |
| 6,863,724 B2 | 3/2005 | Bailey et al. | |
| 7,241,821 B1 | 7/2007 | Hayner et al. | |
| 2003/0203997 A1 * | 10/2003 | Colvin et al. | 524/71 |
| 2006/0293420 A1 | 12/2006 | Prejean et al. | |
| 2007/0027261 A1 | 2/2007 | Prejean et al. | |
| 2007/0191515 A1 | 8/2007 | Hergenrother et al. | |
| 2008/0009567 A1 | 1/2008 | Hergenrother et al. | |

FOREIGN PATENT DOCUMENTS

| | | | |
|---|---|---|---|
| EP | 1 201 717 A1 | 5/2002 | |
| FR | 2 533 935 A1 | 4/1984 | |
| FR | 2 816 628 A1 | 11/2001 | |

OTHER PUBLICATIONS

International Search Report dated Sep. 13, 2010; International Application No. PCT/US2010/029022.
Washington Asphalt Pavement Association; Marshall Method, XP002594539; Internet Citation, [Online] 2002, pp. 1-2, ; Retrieved from the Internet: URL:http://www.asphaltwa.com/wapa_web/modules/05_mix_design/05_marshall.htm> [retrieved on Jul. 30, 2010] the whole document.
Loizos, A., Partl, M.N., Scarpas, T., and Al-Qadi, I.L.; Advanced Testing and Characterization of Bituminous Materials (vol. I), XP002594540; Proceedings of the 7th International Rilem Symposium ATCBM09 on Advanced Testing and Characterization of Bituminous Materials, Rhodes, Greece; May 27-29, 2009; CRC Press.
Loizos, A., Partl, M.N., Scarpas, T., and Al-Qadi, I.L.; Advanced Testing and Characterization of Bituminous Materials (vol. II), XP002594541; Proceedings of the 7th International Rilem Symposium ATCBM09 on Advanced Testing and Characterization of Bituminous Materials, Rhodes, Greece; May 27-29, 2009; CRC Press.
Saleem, J.; Sulfur Modification of Polymers for Use in Asphalt Binders, XP002594542; A Thesis Presented to the Deanship of Graduate Studies King Fahd University of Petroleum & Minerals, Dhahran, Saudi Arabia; Jun. 2008.
Marcilla, A., et al., "MS Study of the Gases Evolved in the Pyrolysis of Ethylene-Vinyl Acetate Copolymers Comparison Between Thermal and Catalytic Processes," Journal of Analytical and Applied Pyrolysis, (2005), pp. 393-400, vol. 74, Issues 1-2, Elsevier B.V.
McGrattan, B. J., "Examinig the Decomposition of Ethylene-Vinyl Acetate Copolymers Using TG/GC/IR," Applied Spectroscopy, (1994), pp. 1472-1476, vol. 48, No. 12, Society for Applied Spectroscopy.
McKay, K. W., et al., "The Influence of Styrene-Butadiene Diblock Copolymer on Styrene-Butadiene-Styrene Triblock Copolymer Viscoelastic Properties and Product Performance," Journal of Applied Polymer Science, (1995) pp. 947-958, vol. 56, No. 8, John Wiley & Sons, Inc.
Sultan, B. A., et al., Thermal Degradation of EVA and EBA—A Comparison. I. Volatile Decomposition Products, Journal of Applied Polymer Science, (1991) pp. 1737-1745, vol. 43, No. 9, John Wiley & Sons, Inc.
Sultan, B. A., et al., Thermal Degradation of EVA and EBA—A Comparison. II. Changes in Unsaturation and Side Group Structure, (1991) pp. 1747-1759, vol. 43, No. 9, John Wiley & Sons, Inc.
Sultan, B. A., et al., Thermal Degradation of EVA and EBA—A Comparison. III. Molecular Weight Changes, Journal of Applied Polymer Science, (1991) pp. 1761-1771, vol. 43, No. 9, John Wiley & Sons, Inc.

* cited by examiner

*Primary Examiner* — David W Wu
*Assistant Examiner* — Marie Reddick
(74) *Attorney, Agent, or Firm* — Bracewell & Giuliani LLP; Constance Gall Rhebergen

(57) ABSTRACT

Disclosed herein are a homogeneous sulfur-modified polymer composition, a method of preparing sulfur-modified polymer, and an asphaltic concrete mixture.

16 Claims, 7 Drawing Sheets

SULFUR EXTENDED POLYMER FOR USE IN ASPHALT BINDER AND ROAD MAINTENANCE

CROSS-REFERENCE TO RELATED APPLICATIONS

This application claims the benefit of U.S. Provisional Patent Application Ser. No. 61/165,847, filed on Apr. 1, 2009, which hereby is incorporated by reference in its entirety.

FIELD OF THE INVENTION

Disclosed herein are a homogeneous sulfur-modified polymer composition, a method of preparing the homogeneous sulfur-modified polymer composition, and an asphaltic concrete mixture.

DESCRIPTION OF THE RELATED ART

As modern commerce depends on reliable and cost-effective methods for delivering products from suppliers to users, the availability of durable and reliable highways, roads and other support surfaces for vehicles is vital for sustaining a modern economy. To provide better support surfaces, highways, roads, and sidewalks are commonly paved with a layer or mat of asphaltic concrete which is laid over the surface of the sub-base. Asphalt is preferred over cement to pour roads because it is less expensive and very durable. Asphalt can also be poured at night, which allows major roads to be shut down at the least busy of times for maintenance. Relative to road noise, asphalt is also quieter than cement, making it the better choice for roads.

Asphalts are essentially mixtures of bitumen, as binder, with aggregate, in particular filler, sand and stones. There are many different types of asphalts available and their characteristics can vary quite significantly. The design of asphalts for bituminous paving application is a complex process of selecting and proportioning materials to obtain the desired properties in the finished construction while minimize undesirable characteristics.

In evaluating and adjusting mix designs, the aggregate gradation and the binder content in the final mix design are balanced between the stability and durability requirements for the intended use. The final goal of mix design is to achieve a balance among all of the desired properties. Binders and various polymers have been investigated for reaching similar goals, and other modifications have been studied.

Unsaturated thermoplastic elastomers like styrene-butadiene-styrene (SBS) block copolymers are polymers used for asphalt modification. They enhance the elastic recovery capacities of asphalt and, therefore, its resistance to permanent deformations. However, unsaturated elastomeric polymers are quite expensive and are subjected to degradation when exposed to atmospheric agents and mechanical stress. Due to their fragility, they are typically used as virgin polymers. This can result in a significant cost increase for the product. While SBS is recognized for performance benefits, research has focused on most cost effective modifiers in exchange for sacrificing superior performance.

Olefinic polymers have been investigated for use as modifiers. They are available in large quantities with different mechanical properties and at low cost. Polyethylene (PE) and polypropylene (PP) are elastomers. They bring a high rigidity (i.e., lack of elasticity, resistance to bending) to the product and significantly reduce deformations under traffic load. Due to their non-polar nature, PE and PP suffer from the drawback that they are almost completely immiscible with asphalt, and are thus limited in use.

Conventional asphalts often do not retain sufficient elasticity in use and, also, exhibit a plasticity range which is too narrow for use in many modern applications such as road construction. The characteristics of road asphalts can be improved by incorporating into them an elastomeric-type polymer. There exists a wide variety of polymers that can be mixed with asphalt. Of these, SBS is a commonly used polymer in asphalt modification. The modified asphalts thus obtained commonly are referred to variously as bitumen/polymer binders or asphalt/polymer mixes. There is a need for a modification to hotmix asphalt concrete mixes that would increase the resistance to permanent deformation while maintaining or increasing the modulus of the mix at intermediate temperatures without affecting the binder properties significantly.

The bituminous binders, even of the bitumen/polymer type, which are employed at the present time in road applications often, do not have the optimum characteristics at low enough polymer concentrations to consistently meet the increasing structural and workability requirements imposed on roadway structures and their construction. In order to achieve a given level of modified asphalt performance, various polymers are added at some prescribed concentration. Current practice is to add the desired level of a single polymer, sometimes along with a reactant which promotes cross-linking of the polymer molecules until the desired asphalt properties are met. This reactant typically is sulfur in a form suitable for reacting.

When added to bitumen at 140° C., sulfur is finely dispersed in bitumen as uniformly small particles; coagulation and settlement of sulfur particles become noticeable after a few hours. Therefore, the sulfur extended asphalt (SEA) mixtures can be produced directly in the mixing plant just before the laying of the asphalt mixture. One major concern in handling sulfur-asphalt mix is the fear of the evolution of hydrogen sulfide ($H_2S$) during production and laying. This problem can be ameliorated by adding carbon or ash to sulfur. $H_2S$ evolution starts at temperatures higher than 150° C., so that the application at temperatures up to 150° C. avoids pollution and safety problems. However, $H_2S$ evolution starts well below 150° C., i.e. about 130° C. Moreover, below 120° C., neither the reaction of the asphalt and sulfur nor the cross-linking of the SBS/sulfur blend could take place.

The high-temperature storage stability of SBS modified asphalt can be improved significantly with the addition of elemental sulfur. A cross-linked SBS network structure in the modified binders is formed by adding sulfur to SBS modified asphalt. Moreover, the high temperature performance of the resulting binders was improved and their temperature susceptibility was reduced. The SBS content affects the rheological properties of the asphalts. Increasing sulfur levels leads to increasing cross-linking density in the modified binders, and consequently the rheological properties of SBS-modified asphalt are improved.

Ethylene vinyl acetate (EVA) copolymers undergo a two-step decomposition: the first corresponding to the loss of the acetoxy groups, from the vinyl acetate (VA) comonomers, yielding "polyene domains" in the polymer chain. The second, which takes place at higher temperatures, is formed by two separate processes, one corresponding to the decomposition of these "polyene domains", and another to the decomposition of the "polyethylene (PE) domains", corresponding to the initial ethylene units. These two domains decompose in a slightly different way. Moreover, the FTIR spectra of the gas evolved in the pyrolysis process during the first stage of decomposition showed that it corresponds primarily to acetic acid, although small amounts of CO, $CO_2$ and $CH_4$ are also evident. On the other hand, the spectra obtained for the second weight loss process of EVA correspond to a mixture of 1-alkenes and alkanes, in addition to a lesser presence of aromatic compounds.

SUMMARY OF THE INVENTION

An embodiment described in this application is a homogeneous sulfur-modified polymer composition comprising a hydrocarbon saturated polymer prepared by pyrolyzing the hydrocarbon saturated polymer to produce a hydrocarbon unsaturated polymer and acetic acid and reacting the hydrocarbon unsaturated polymer with elemental sulfur such that cross-linking is achieved. The acetic acid being thereafter substantially removed such that the hydrocarbon unsaturated polymer is substantially free of acetic acid during the reaction with the elemental sulfur. In another described embodiment, the resulting composition is the homogeneous sulfur-modified polymer containing at least about 20 wt. % sulfur, or at least about 30 wt. % sulfur, or at least about 40 wt. % sulfur, or at least about 45 wt. % sulfur, or at least about 50 wt. % sulfur.

In another described embodiment, a method of preparing sulfur-modified polymer comprising the steps of: (i) pyrolyzing the hydrocarbon saturated polymer to produce the hydrocarbon unsaturated polymer; and (ii) reacting elemental sulfur with the hydrocarbon unsaturated polymer through cross-linking; to produce the sulfur-modified polymer. In another embodiment, the reaction time is not more than 5 minutes, or not more than 10 minutes, or not more than 15 minutes, or not more than 20 minutes. In another embodiment, the reaction is conducted at a reaction temperature on the lower end of the pyrolysis scale. For example, the reaction temperature is not greater than about 150° C., or not greater than about 175° C., or not greater than about 200° C., or not greater than about 225° C.

In another described embodiment, an asphalt mixture comprising (i) a homogeneous sulfur-modified polymer; and (ii) asphaltic concrete. In an aspect, the asphaltic concrete is prepared in accordance with a Marshall mix design, as will be understood by those of skill in the art.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

DETAILED DESCRIPTION OF THE EXEMPLARY EMBODIMENTS

Figure 1:
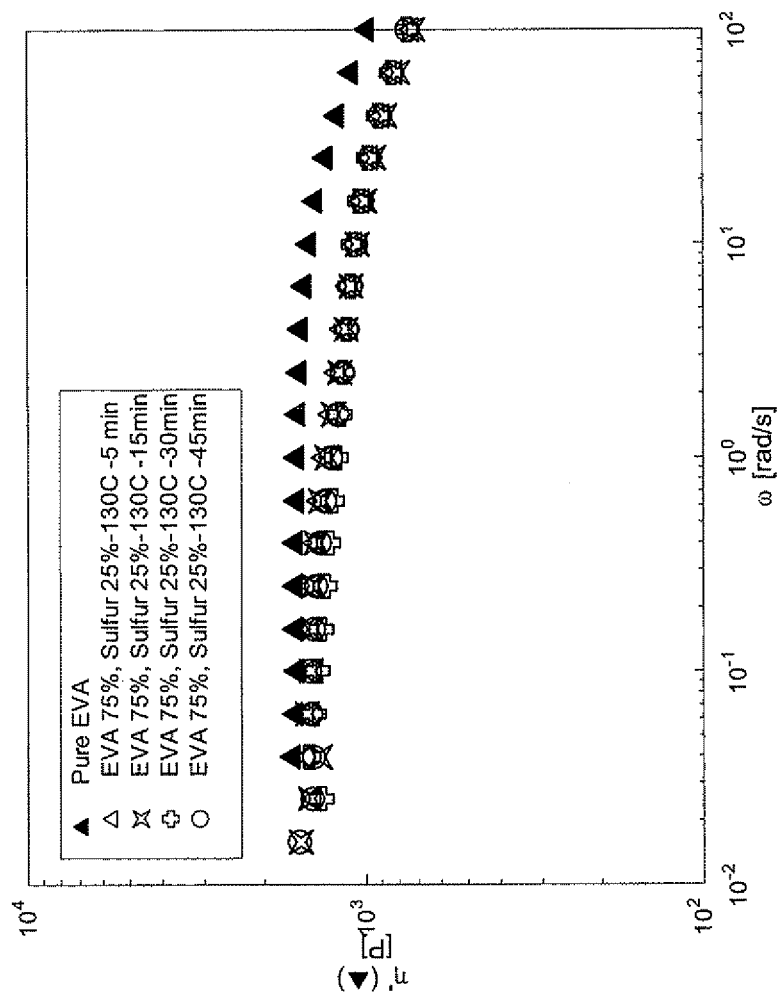
FIG. 1 shows dynamic viscosities ($\eta'$) of pure EVA28-150 and EVA28-150/sulfur blend as a function of frequency ($\omega$) ($T_{blend}$=130° C.; $T_{test}$=120° C.; sulfur composition=25 wt. %).

It is desirable for asphaltic concrete, including asphalt and aggregate, asphalt compositions for resurfacing asphaltic concrete, and similar asphalt compositions to exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

The grades and characteristics of asphalt paving products are defined by various professional organizations, such as the Asphalt Institute. For example, Rolling Thin Film Oven (RTFO) and Pressure Aging Vessel (PAV) studies are used to simulate binder aging (hardening) characteristics. Dynamic Shear Rheometers (DSR) are used to measure binder properties at high and intermediate temperatures. This is used to predict permanent deformation or rutting and fatigue cracking. Industry custom uses the short form RTFO DSR to indicate the temperature at which a sample will show sufficient rutting resistance after rolling thin film oven (RTFO) aging (minimum rutting resistance as defined as a "G*/sin δ" over 2.20 kPA and measured by a dynamic shear rheometer (DSR)). Fatigue cracking is a series of small, jagged, interconnecting cracks caused by failure of the asphalt concrete surface under repeated traffic loading. Bending Beam Rheometers (BBR) are used to measure binder properties at low temperatures. These values predict thermal or low temperature cracking. Various industry standards, such as the Superpave standard, exist for defining such procedures for these experiments and measurement.

Asphalt grading is given in accordance with accepted standards in the industry, such as PG 64-22. The PAV-DSR temperature and the BBR-M temperature are two additional useful parameters of asphalt paving products.

Asphaltic concrete comprises asphalt combined with aggregates in various rations, one exemplary ration being approximately 95 parts by weight of aggregate to approximately 5 parts by weight of liquid asphalt. The asphaltic cement is used to bind together the aggregate material and limit its mobility when a load is applied. The aggregate is usually a mixture of sand, gravel, and stone; the largest pieces of aggregate having a diameter equal to about ⅔ the thickness of the asphalt mat. The aggregate has crushed particles to provide sharp edges in the gravel and stone which, when combined with the liquid asphalt, create an aggregate interlock which improves the strength of the mat. The aggregate and liquid asphalt are heated and mixed to form an asphalt paving composition called hot-mix asphalt (HMA). Thermal stress of asphalt is stress resulting from non-uniform temperature distribution or differential thermal expansion.

Elastic modulus is sometimes called Young's modulus. An elastic modulus (E) can be determined for a solid material and represents a constant ratio of stress and strain (a stiffness): E stress/strain. A material is elastic if it is able to return to its original shape or size immediately after being stretched or squeezed. Almost all materials are elastic to some degree as long as the applied load does not cause it to deform permanently. Thus, the "flexibility" of any object or structure depends on its elastic modulus and geometric shape. The modulus of elasticity for a material is basically the slope of its stress-strain plot within the elastic range.

Asphalt has been the subject of exhaustive study to improve characteristics for use in paving. Various properties of asphalt are manipulated to produce a product that has the appropriate wear properties, rut resistance, fatigue and low temperature cracking resistance, adhesion strength, viscosity and pour point. Rut resistance is resistance to longitudinal surface depressions in the wheelpaths. Adhesion strength is the maximum adhesion strength of the joint sealant and the joint reservoir, including but not limited to, between the aggregate and the binder. Shove resistance is resistance to permanent, longitudinal displacement of a localized area of the pavement surface caused by traffic pushing against the pavement. Heavy hydrocarbon that can be derived from, without limitation, natural asphalt (such as Gilsonite®), shale asphalt, bottoms from a solvent deasphalting process, hard asphalt, blown asphalt, stiff refined asphalt, a flux. Asphalt is usually the base ingredient for the primer and the binder. A primer can be asphalt, fibers (including but not limited to, mineral or cellulose), processing agent (including but not limited to, oligomeric wax, carboxylated, derivative of oligomeric wax, or low molecular weigh polyolefins), polymeric or elastomeric additive, or asphalt-derived. A primer melts to the aggregate. Asphalt binders without polymers are referred to as "neat".

In view of the foregoing, as an embodiment of the present invention, a homogeneous sulfur-modified polymer composition for use in asphaltic concrete for improved properties relative to rutting and emissions is provided. The homogeneous sulfur-modified polymer composition includes reaction products from a reaction of a hydrocarbon unsaturated polymer with an elemental sulfur. The hydrocarbon unsaturated polymer and acetic acid being formed through pyrolyzing a hydrocarbon saturated polymer to produce a hydrocarbon unsaturated polymer and acetic acid. The acetic acid being thereafter substantially removed, typically by evaporation, such that the hydrocarbon unsaturated polymer is substantially free of acetic acid during the reaction with the elemental sulfur.

As described herein, the amount of sulfur in the homogeneous sulfur-modified polymer can vary, depending on the desired properties of the final product. In an aspect, the resulting composition is the homogeneous sulfur-modified polymer containing at least about 20 wt. % sulfur, or at least about 30 wt. % sulfur, or at least about 40 wt. % sulfur, or at least about 45 wt. % sulfur, or at least about 50 wt. % sulfur. Other suitable amounts of sulfur than can be used in embodiments of the present invention will be apparent to those of skill in the art and are to be considered within the scope of the present invention.

In another aspect, the elemental sulfur and the hydrocarbon unsaturated polymer are fed to the reaction in a wt. % ratio that ranges from about 25:75 to about 75:25. Other suitable amounts of each component will be apparent to those of skill in the art and are to be considered within the scope of the present invention.

The types of hydrocarbon saturated polymers that can be used in embodiments of the present invention can be varied, depending upon the desired physical properties of the homogeneous sulfur-modified polymer composition. For example, in an aspect, the hydrocarbon saturated polymer can include ethyl vinyl acetate (EVA) copolymer, ethylene vinyl acetate copolymer, or combinations thereof. Other suitable types of polymers that can be used as the hydrocarbon saturated polymer will be apparent to those of skill in the art and are to be considered within the scope of the present invention.

The properties of the hydrocarbon saturated polymers can vary based upon the type of hydrocarbon saturated polymer that is used. For example, in an aspect, the hydrocarbon saturated polymer has a melt index that ranges from about 150 g/10 min to about 400 g/10 min. In another aspect, the hydrocarbon saturated polymer has a peak melting temperature of less than about 70° C.

The types of hydrocarbon unsaturated polymers that are produced in embodiments of the present invention depend upon the type of hydrocarbon saturated polymer that is being used. In an aspect, the hydrocarbon unsaturated polymer comprises a polyene. For example, the polyene can be a polydiene. Other suitable types of hydrocarbon unsaturated polymers that can be used in embodiments of the present invention will be apparent to those of skill in the art and are to be considered within the scope of the present invention.

Besides the compositional embodiments provided herein, methods of preparing sulfur-modified polymers are also provided as embodiments of the present invention. For example, in one embodiment, the method of preparing the sulfur-modified polymer includes the steps of: (i) pyrolyzing a hydrocarbon saturated polymer to produce a hydrocarbon unsaturated polymer and acetic acid that is removed; and (ii) reacting an elemental sulfur with the hydrocarbon unsaturated polymer through cross-linking; to produce the sulfur-modified polymer.

As indicated herein, various types of equipment can be used to prepare the sulfur-modified polymers. The same or different types of equipment can be used for each step of the method embodiments described herein. For example, a blender that is a batch blender, a high shear blender, a melt blender, or combinations thereof can be used to perform the method steps of preparing the sulfur-modified polymers. Other suitable types of equipment that can be used to produce the sulfur-modified polymers will be apparent to those of skill in the art and are to be considered within the scope of the present invention.

The reaction conditions in which the sulfur-modified polymers are prepared can vary depending upon the desired properties of the product. One such condition that can be varied is the reaction temperature for the pyrolyzation step. In an aspect, the step of pyrolyzing has a reaction temperature of less than about 225° C. An another example, the step of reacting has a reaction temperature of about 130° C. to about 250° C. Other suitable reaction temperatures will be apparent to those of skill in the art and are to be considered within the scope of the present invention.

Besides the reaction temperatures, the reaction times used to produce the sulfur-modified polymers can also vary. For example, the step of reacting has a reaction time of less than about 20 minutes. Other suitable reaction times will be apparent to those of skill in the art and are to be considered within the scope of the present invention.

In addition to the sulfur-modified polymer and methods of preparing it, an asphaltic concrete mixture is also provided as an embodiment of the present invention. In this embodiment, the asphaltic concrete mixture includes (i) a homogeneous sulfur-modified polymer; and (ii) asphaltic concrete. In an aspect, the asphaltic concrete is prepared in accordance with a Marshall mix design, as will be understood by those of skill in the art. Other suitable methods of producing asphaltic concrete will be apparent to those of skill in the art and are to be considered within the scope of the present invention.

The amount of the homogeneous sulfur-modified polymer used in various embodiments of the present invention can vary, depending upon the desired properties of the resulting asphaltic concrete mixture. For example, in an aspect, the homogeneous sulfur-modified polymer is present in the asphaltic concrete mixture in a range of about 4 wt. % to about 6 wt. %. Other suitable amounts of the homogeneous sulfur-modified polymer that can be used in embodiments of the present invention will be apparent to those of skill in the art and are to be considered within the scope of the present invention.

The asphaltic concrete mixture of the present invention has physical properties that make it an attractive composition to use in many applications. For example, the asphaltic concrete mixture displays very good rut resistance. In an aspect, the mixture shows rutting of less than about 10 mm after 20,000 cycles based on a wheel load of about 100 lb. and a wheel pressure of about 100 psi.

As another property that can be attractive in many applications is the low performance grade viscosity displayed by embodiments of the present invention. In an aspect, the asphaltic concrete mixture of the present invention has a performance grade viscosity of less than about 1300 cP at 135° C. Examples are described herein that illustrate that the performance grade viscosity can vary between about 635 to about 1300 cP at 135° C. (see Table 5).

Another property that is important for many applications is the emission of various gases from the compositions. The compositions of the present invention have very low emission rates, which is particularly surprising due to the inclusion of sulfur in the compositions. For example, the asphaltic concrete mixture has a sulfur dioxide emission rate of less than about 0.20 ppm in a hot-mix asphalt batch. As another example, the asphaltic concrete mixture has a hydrogen sulfide emission rate of less than about 1.30 ppm in a hot-mix asphalt batch.

All of the properties and conditions associated with the preparing the homogeneous sulfur-modified polymer and the resulting product apply equally in the embodiments of the present invention that include its use in the asphaltic concrete mixture.

Examples are provided herein that describe the properties of the compounds used to produce the sulfur-modified polymers, the reaction conditions, the resulting properties of the sulfur-modified polymers, and properties associated with the asphaltic concrete mixture.

Sulfur Modification of EVA

In one example, the sulfur modification process is carried out in a batch melt blender. Homogeneous sulfur-modified polymer (HSMP) is produced by using polymer pyrolysis in the presence of elemental sulfur. The process takes place in a constant volume well mixed internal blender at constant temperature. For example, the mixer can be a continuously stirred tank reactor (CSTR) operated under isothermal conditions. HSMP is produced through a two step process taking place in the same batch reactor. The first step is the pyrolysis of the hydrocarbon saturated polymer to produce the hydrocarbon unsaturated polymer (that can include polydienes), such as the pyrolysis of EVA polymer to produce unsaturated polydiene and acetic acid. Removal of each VA group will result in a double bond on the backbone as shown in the following reaction mechanism:

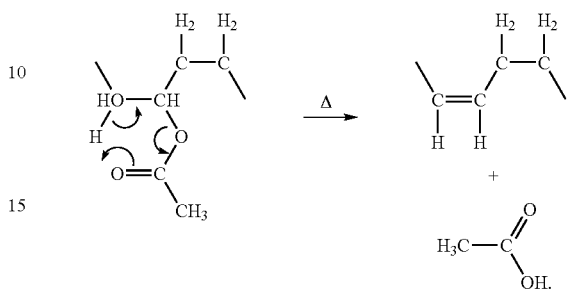

The acetic acid is a small molecule and it will evaporate at 200° C. The second step is the reaction of sulfur with polydienes, including cross-linking, to produce HSMP. The parameters considered in the second step of the process include polymer type, sulfur content, reaction temperature and reaction time. In this example, the reaction time is varied between 10-30 minutes and EVA with different VA contents and melt indices is used. The hydrocarbon saturated polymer for this example is selected with consideration of the following properties: (1) maximize sulfur content in the homogeneous sulfur-modified polymer, (2) control viscoelastic properties of polymer-asphalt blend, (3) reduce high temperature emissions, (4) improve high temperature performance, and/or (5) have a competitive cost and a melting temperature below 145° C.

The second step of the process, also referred to as the sulfurization step, is carried out in a batch blender. Alternately, a high shear blender can be used.

Haake PolyDrive melt blender is useful for preparing HSMP. The melt blender acts as a computer-controlled torque rheometer. In one embodiment, the elemental sulfur and the polymer are physically blended to create a sulfur-polymer blend before feeding the sulfur-polymer blend to the melt blender. For certain examples, the sulfur-polymer blend is mixed in the melt blender at 100 rpm. The blender acts as a batch-stirred reactor with a constant volume. Samples were collected at the end of the mixing process and analyzed by different techniques. The reaction temperature is varied between 130-250° C. Three different temperatures, namely 130° C., 200° C. and 250° C., were used. Results are shown in Table 2.

The experiment was first started with a mixture of 25 wt. % sulfur and 75 wt. % of EVA28-150 copolymer (contains 28 wt. % VA and has a melt index of 150) and heated to 130° C. for 15 min, 30 min and 45 min; hence, three different samples were examined. Similarly three more samples were prepared having the same parameters but the percentage of sulfur in the mixture was increased to 75 wt. %. The temperature was then raised to 200° C. with 25 wt. % sulfur and mixed for 30 min. Again the quantity of sulfur was increased to as high as 60 wt. % and the experiment was performed for 10, 20 and 30 min at 200° C. No reaction was detectable at 130° C. as confirmed by elemental sulfur analysis after sample precipitation. The temperature of 250° C. is not exceeded. In one embodiment, a temperature of 200° C. was selected. Depending on reaction conditions and amount of initial sulfur in the blend as well as polymer characteristics (see Table 1 for the characteristics of polymers used in this study) some residual elemental sulfur can be found in HSMP. The amount of reacted sulfur as well as free elemental sulfur is determined through elemental analysis. The procedure is described below.

TABLE 1

Characterization of Polymers

| Resin | Product # | Manufacturer | $T_m$, ° C. | VA, wt. % | MI* | Density g/cm$^3$ |
|---|---|---|---|---|---|---|
| EVA28-150 | UL 15028 | ExxonMobil | 66 | 27.5 | 150 | 0.9470 |
| EVA33-400 | AD0433EH2 | ExxonMobil | 59 | 33 | 400 | 0.9550 |
| Polybilt ™ modifier | Polybilt ™ 101 | ExxonMobil | >50° C. | 14 | N/A | N/A |

*g/10 min

Analysis of Sulfur-Modified EVA

For the determination of the quantity of free elemental sulfur present in HSMP, a Vario EL Elemental analyzer was used. In this regard, 200 mg of HSMP was added in 10 ml of CCl$_4$, heated to 65° C. and agitated for about 1½ hrs for complete disintegration of the polymer. Then 25 ml of acetone was added to dissolve all the free elemental sulfur present in the HSMP and precipitated out the polymer. The sample was kept at room temperature for ½ hr. to ensure maximum precipitation.

The precipitated polymer was then analyzed for sulfur in the elemental analyzer. The residual sulfur in the polymer is the chemically bonded sulfur while free elemental sulfur (unreacted sulfur) will stay in the solution. This method of analysis was tested on free elemental sulfur and it confirmed the solubility of all sulfur in the above solvents as per the described procedure.

Once the reaction temperature is raised to 200° C. the amount of chemically bonded sulfur significantly increases as compared to the reaction temperature of 130° C. In the case of 25 wt. % sulfur and 75 wt. % EVA28-150 more than 90% of the sulfur has reacted in 30 minutes (see Table 2). With an amount of elemental sulfur of 60 wt. %, extremely high amounts of sulfur were incorporated into the HSMP. The amount of chemically bonded sulfur varied between 30-40 wt. % according to reaction time which was in the range of 10-30 minutes. This suggests that the presence of excess sulfur increases the conversion.

TABLE 2

Percentage of chemically reacted S in EVA28-150 modified Polymer (HSMP)

| No. | Total S, wt. % | Time (min) | Temp (° C.) | Chemically bonded S in HSMP | Free S |
|---|---|---|---|---|---|
| 1 | 25 | 15 | 130 | 0.2 | 24.8 |
| 2 | 25 | 30 | 130 | 0.1 | 24.9 |
| 3 | 25 | 45 | 130 | 0.2 | 24.8 |
| 4 | 75 | 15 | 130 | 0.1 | 74.9 |
| 5 | 75 | 30 | 130 | 0.3 | 74.7 |
| 6 | 75 | 45 | 130 | 0.2 | 74.8 |
| 7 | 25 | 30 | 200 | 23 | 2.0 |
| 8 | 60 | 10 | 200 | 31.3 | 28.7 |
| 9 | 60 | 20 | 200 | 40.6 | 19.4 |
| 10 | 60 | 30 | 200 | 35.8 | 24.2 |

To check the validity of the elemental analysis technique different steps were followed, the results of which are shown in Table 3. The ratio of sulfur was varied in the range of 40-60 wt. % and the mixing time was chosen as either 20 or 30 minutes. The results for EVA28-150 and EVA33-400 showed very good reproducibility for all samples. Blends of 60 wt. % sulfur and 40 wt. % EVA33-400 showed the highest sulfur incorporation which ranged from 42-44 wt. depending on reaction time. The use of 40 wt. % sulfur resulted in low sulfur incorporation (~19 wt. %).

TABLE 3

Sulfur Analysis for precipitated HSMP Series

| No. | Sample ID | S:EVA wt. % | Time (min) | Sulfur wt. % |
|---|---|---|---|---|
| 1 | EVA28-150 | 40:60 | 20 | 19.3 (19.0) |
| 2 | EVA28-150(R)* | 40:60 | 20 | 18.7 (19.0) |
| 3 | EVA28-150 | 50:50 | 20 | 33.9 (33.5) |
| 4 | EVA28-150(R)* | 50:50 | 20 | 33.0 (33.5) |
| 5 | EVA33-400(R)* | 50:50 | 20 | 38.7 (40.6) |
| 6 | EVA33-400(R)* | 50:50 | 20 | 43.4 (40.6) |
| 7 | EVA33-400(R)* | 50:50 | 20 | 37.6 (40.6) |
| 8 | EVA33-400(R)* | 50:50 | 20 | 42.6 (40.6) |
| 9 | EVA33-400(R)* | 60:40 | 20 | 42.4 (42.9) |
| 10 | EVA33-400(R)* | 60:40 | 20 | 41.9 (42.9) |
| 11 | EVA33-400(R)* | 60:40 | 30 | 43.0 (42.9) |
| 12 | EVA33-400(R)* | 60:40 | 30 | 44.2 (42.9) |

(R)* Repeat

The results shown in Table 3 can be summarized as follows: (a) the data showed a very good reproducibility of results obtained for the same batch or from different batches (average values are shown between parentheses); (b) the data suggests that a mixing time of 20 minutes provides good results with most of the polyenes being saturated with sulfur; and (c) the incorporation of sulfur is advantageously proportional to the amount of VA in the polymer when utilizing the process of the current invention. For example, the increase in the sulfur incorporation in the 50:50 blends of sulfur and EVA33-400 are directly proportional to VA content (see lines 3-8 in Table 3).

The rheology of the sulfur-polymer blend of 75 wt. % EVA28-150 and 25 wt. % sulfur prepared at 130° C. is shown in FIG. 1 along with the pure EVA28-150. The viscosity of the sulfur polymer blend was reduced by the addition of sulfur since sulfur is a low viscosity liquid at 120° C. The viscosity of the 25 wt. % S blend was almost the same for samples mixed at different mixing times. This suggests that the mixing is physical and no reaction is taking place at 130° C. Viscosity is the resistance of the sulfur polymer blend to shear forces.

Figure 2:
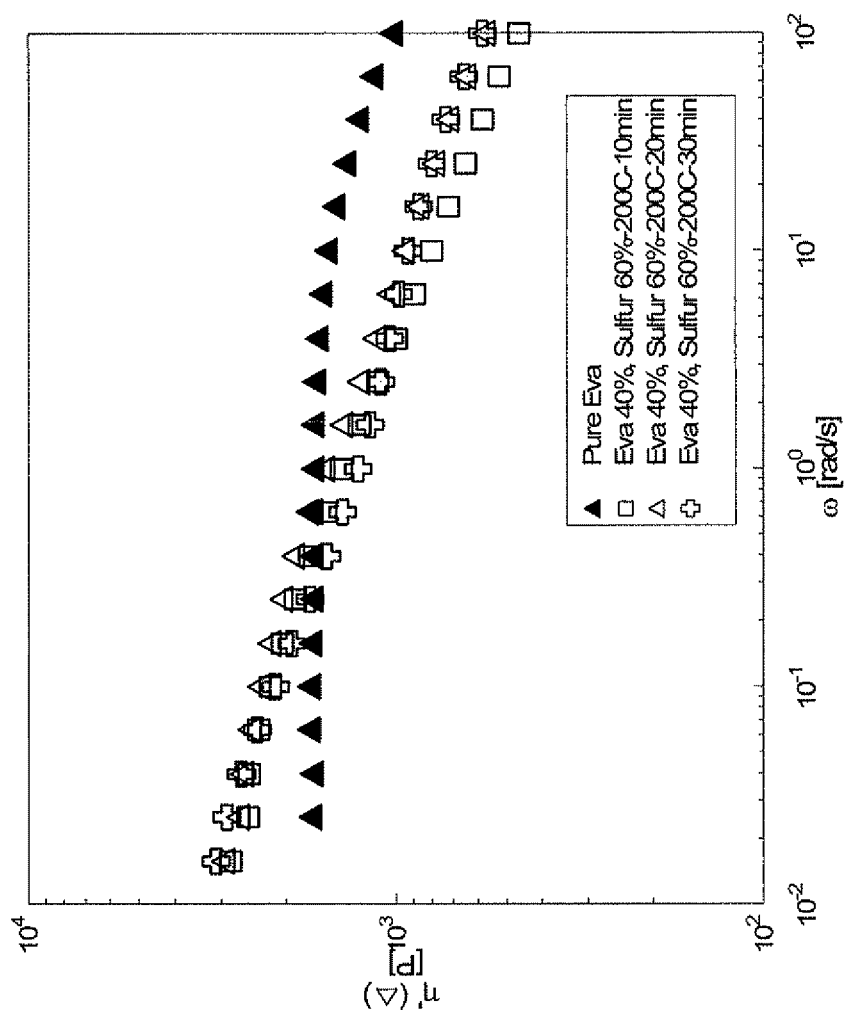
FIG. 2 shows dynamic viscosities ($\eta'$) of pure EVA28-150 and EVA28-150/sulfur as a function of frequency ($\omega$) ($T_{blend}$=200° C.; $T_{test}$=120° C. sulfur composition=60 wt. %).
Figure 3:
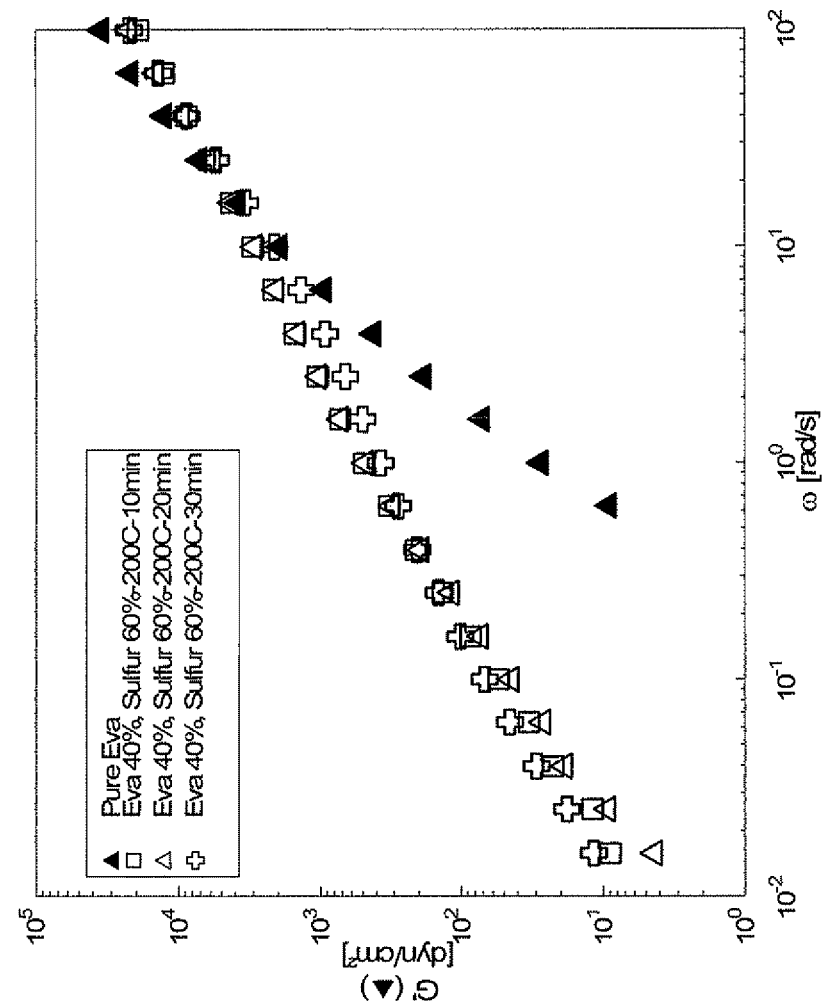
FIG. 3 shows storage moduli, G, of pure EVA28-150 and EVA28-150/sulfur as a function of frequency, $\omega$ ($T_{blend}$=200° C.; $T_{test}$=120° C. sulfur composition=60 wt. %).

However, for samples mixed at 200° C. for 10, 20 and 30 minutes the results are surprisingly different (see FIG. 2). A yield stress behavior at low shear rates was observed in the viscosity vs. frequency curves for all EVA modified polymers. This behavior is typical for cross-linked polymers. Also, a high shear thinning behavior was observed at high rates. At high mixing times, viscosity of samples mixed for 30 minutes are slightly higher than those obtained for mixing time of 10 minutes. In FIG. 3, the elasticity of the same samples was shown.

The homogeneous sulfur-modified polymers showed major improvements in the elastic modulus, G', due to sulfurization. These results are believed to be a direct consequence of cross-linking since physical mixing of a small sulfur molecule with a polymer is expected to reduce rather than increase G' as observed in FIG. 3. The rheology results shown in FIGS. 2 and 3 suggest a decrease in the viscosity and an increase in the elasticity due to sulfurization. The decrease in viscosity with shear improves the mixing process and the increase in elasticity is beneficial for increasing the rutting resistance. Further, the ability to incorporate sulfur in different EVA polymers with different VA content provides means for controlling the sulfur incorporation in HSMP. In addition, the results shown in Table 1 for EVA28-150 and EVA28-400 show how the sulfur modification can be performed for EVA with different melt indices (i.e., with different molecular weights). This means the process of the current invention provides flexibility in incorporating sulfur in EVA with different molecular weights and molecular weight distributions (i.e., different viscoelastic properties).

binder content (OBC) of each mix was determined to satisfy the Saudi Aramco specifications. The results obtained are shown in Table 4 and FIG. 4. Results indicate that all mixes met the specification requirements.

Figure 4:
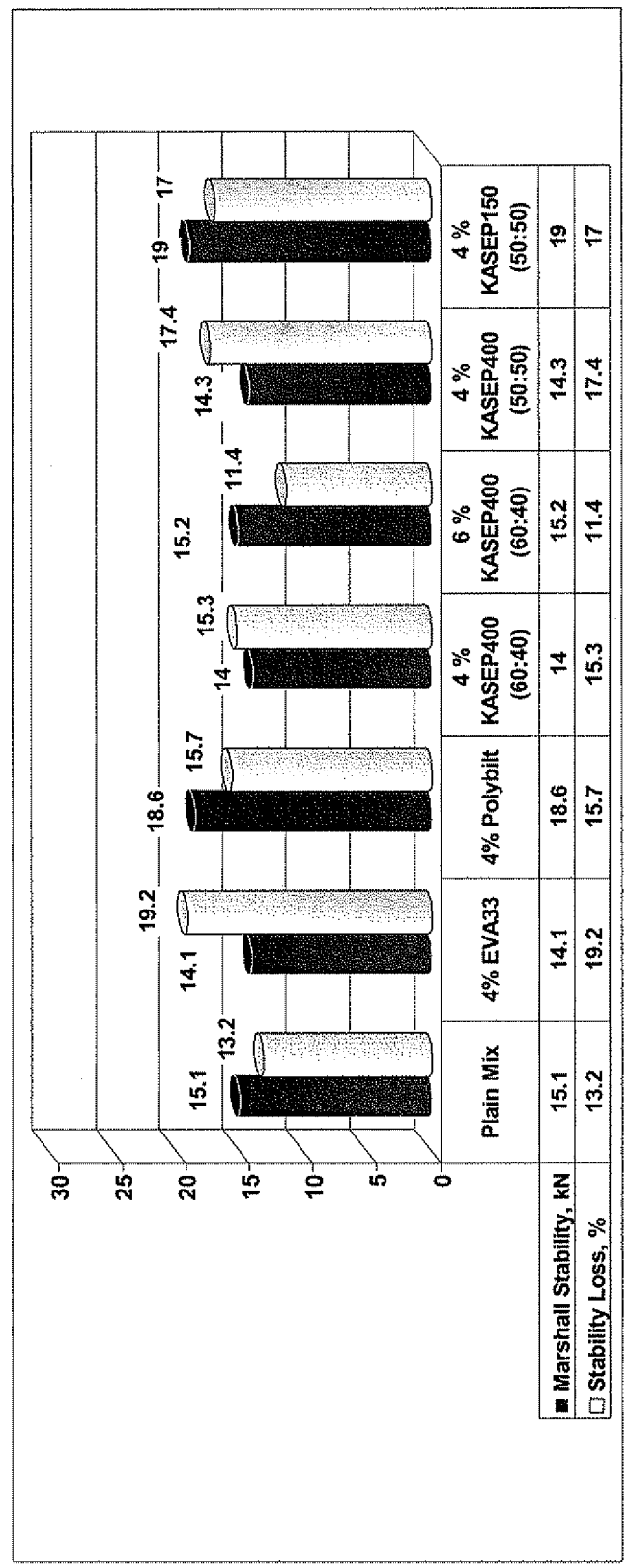
FIG. 4 shows the relation between mix type, Marshall Stability and stability loss.
Figure 5:
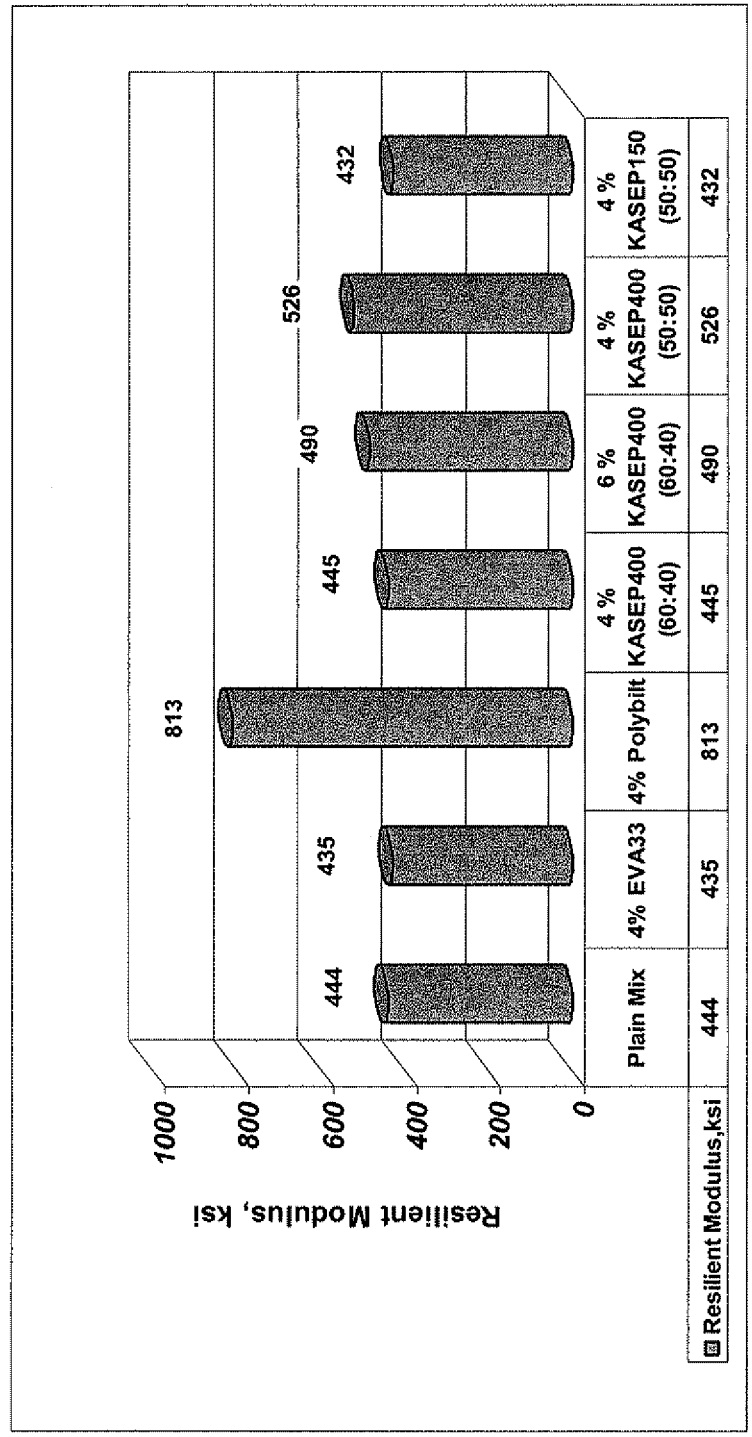
FIG. 5 shows the relation between mix type and resilient modulus.

HSPM asphalt was also evaluated for resilient modulus ($M_R$) at 25° C. Results are shown in FIG. 5. Highest resilient modulus is observed for the Polybilt™ Bitumen Modifier 101 mix. In FIGS. 4 and 5 and Table 4 "HSMP (60:40)" is a form of HSMP with 60 wt. % total sulfur including about 40 wt. % chemically bonded sulfur as shown in Table 3 where the 60 wt. % sulfur blend has resulted in 42-44 wt. % chemically bonded sulfur. HSMP (50:50) is a 50/50 form of HSMP and as shown in Table 3 it contains 38-42 wt. % chemically bonded sulfur. Both samples showed different results with HSMP (50:50) showing better performance.

TABLE 4

Summary of Marshall mix design results

| | Specification | Plain Asphalt Mix | 4% EVA33-400 | 4% Polybilt™ | 4% *HSMP400 (60:40) | 6% *HSMP400 (60:40) | 4% **HSMP400 (50:50) | 4% ***HSMP150 (50:50) |
|---|---|---|---|---|---|---|---|---|
| Optimum Binder Content, % by tot. mix wt. | Optimum +/−0.3% | 4.7 | 4.7 | 4.7 | 4.7 | 4.7 | 4.7 | 4.7 |
| Stability, kN | 8.06 min | 15.1 | 14.1 | 18.6 | 14 | 15.2 | 14.3 | 19.0 |
| Stability Loss, % | 25 max | 13.2 | 19.2 | 15.7 | 15.3 | 11.4 | 17.4 | 17.0 |

*HSMP400: 60 wt. % Sulfur, 40 wt. % EVA33-400;
**HSMP400: 60 wt. % Sulfur, 40 wt. % EVA33-400;
***HSMP150: 50 wt. % Sulfur, 50 wt. % EVA28-150

Asphaltic Concrete Mix Design and Evaluation

Asphaltic concrete mix design for Wearing Course (WC) layer was carried out on aggregate materials from the Eastern province, Saudi Arabia, Polybilt™ bitumen modifier 101 (available from ExxonMobil Chemical Co.) and EVA polymers were collected from local and international markets. Test results indicate that the tested materials have met required specification requirements. Marshall Mix design for WC was carried out utilizing the basic materials properties according to Saudi Aramco SAES-Q-006 specifications. Seven mix designs were prepared with plain asphalt obtained from Ras Tamura refinery and 4 wt. % HSMP (50:50), 4 wt. % Polybilt™ Bitumen Modifier 101, 4 wt. % and 6 wt. % HSMP (60:40), 4 wt. % EVA33-400, and 4 wt. % EVA28-150 in addition to the plain asphaltic concrete mix. Preparations of plain asphalt with HSMP create HSMP asphalt.

HSPM asphalt was prepared using the standard Marshall mix design method in order to obtain the optimum asphalt/binder content (OBC) as per ASTM D 1559 test method. Trial mixes were prepared at different asphalt contents for WC mixes designs using the automatic Marshall Compactor 75 blows and the job mix formula. Mixes were prepared using plain asphalt, modified asphalt binder with 4 wt. % HSMP (50:50), 4 wt. % Polybilt™ Bitumen Modifier 101, 4 wt. % and 6 wt. % HSMP (60:40), 4 wt. % EVA33-400, and 4 wt. % EVA28-150. Thus, the modified binder was used to prepare modified mixes. Marshall specimens were prepared with different asphalt contents for each of the indicated blends were then tested for bulk specific gravity, stability and flow as required in the Marshall method of mix design. The optimum The processes of the invention produce homogeneous sulfur-modified polymer and/or HSMP asphalt that will have one or more or all of the following characteristics: (a) a high content of chemically bonded sulfur in asphalt (preferably up to 42 wt. %), (b) low melting temperature of the homogeneous sulfur-modified polymer (i.e., below 145° C.), (c) acceptable asphaltic-concrete mix properties, (d) a highly competitive cost since sulfur is much cheaper than the polymer, or (e) a simple modification procedure.

In one embodiment, HSMP is used at a level of 4-6 wt. % of bitumen to create HSMP asphalt, depending on the type of asphalt and the properties and VA content of the base polymer used in the modification. The sulfur in HSMP is part of the polymeric structure. Furthermore, the ability to produce sulfur-modified polymer with different viscoelastic properties and sulfur content is another advantage for HSMP.

Performance Characteristics of Resulting Composition

Moisture Resistance (i.e., freeze-thaw cycles or pump action of water traffic loading): The moisture susceptibility is frequently evaluated in the Hamburg Wheel Tracking (HWT) with the samples submerged in water. Generally, it is considered a failure if the rutting exceeds 10 mm after 20,000 cycles. HSMP asphalt is expected to provide superior moisture resistance characteristics.

Resistance to Permanent Deformation: The rut resistance of the mixes can be evaluated using a Hamburg-type wheel tracker (HWT manufactured by Precision Machine Works) without submerging the specimens in water. Rut testing can be carried out at 76° C. A loading rate of 40 passes/minute can be selected to increase the severity of the test. To rank the rut resistance of the mixes either the total accumulated deformation after 20,000 passes or the slope in the linear range is commonly used. The latter is more reliable and a better measure for actual rutting because it eliminates the variability in the initial post-compaction phase. HSMP asphalt is expected to provide superior rut-resistance characteristics.

Figure 6:
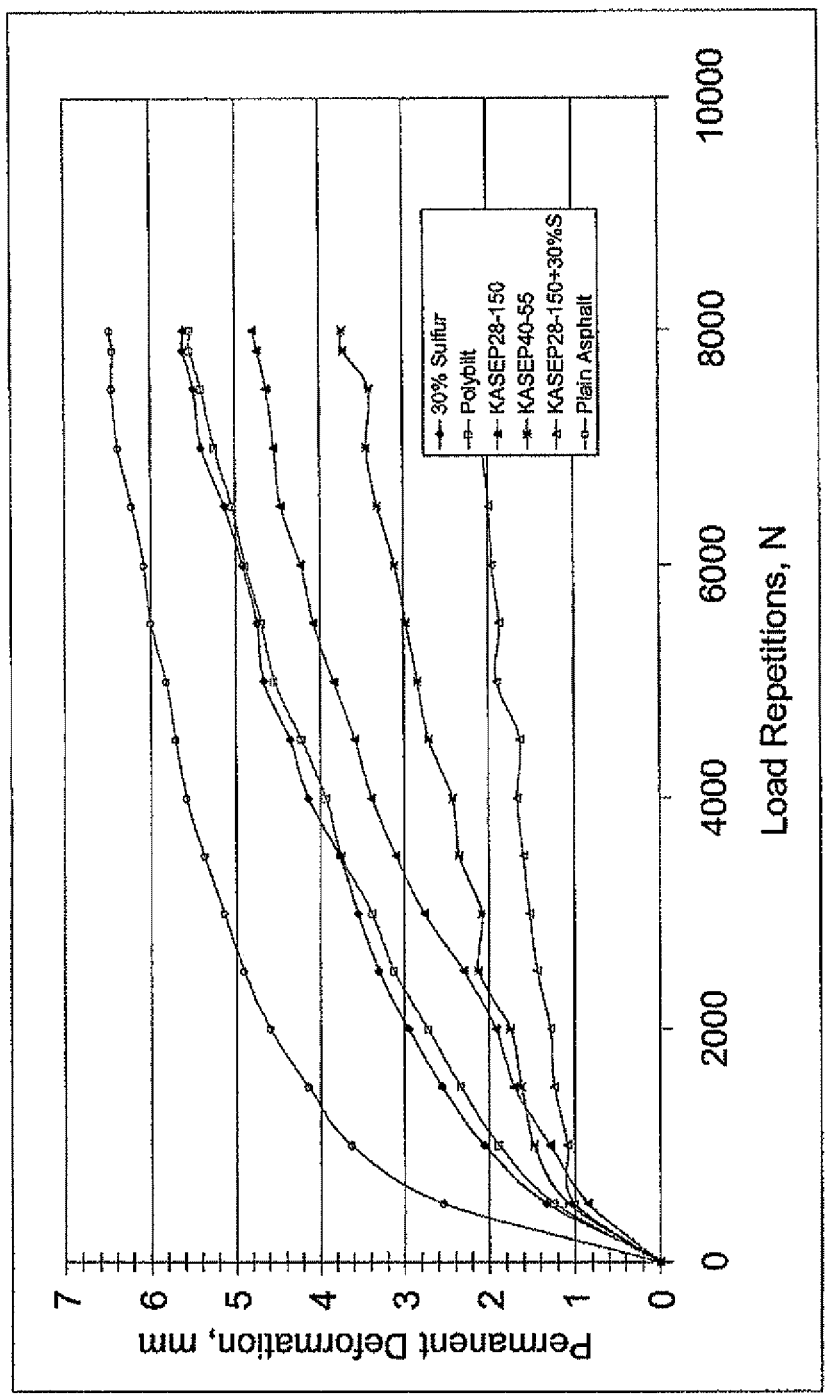
FIG. 6 shows the relationship between load repetitions and rutting for tested mixes. References to KASEP is the same as HSMP.
Figure 7:
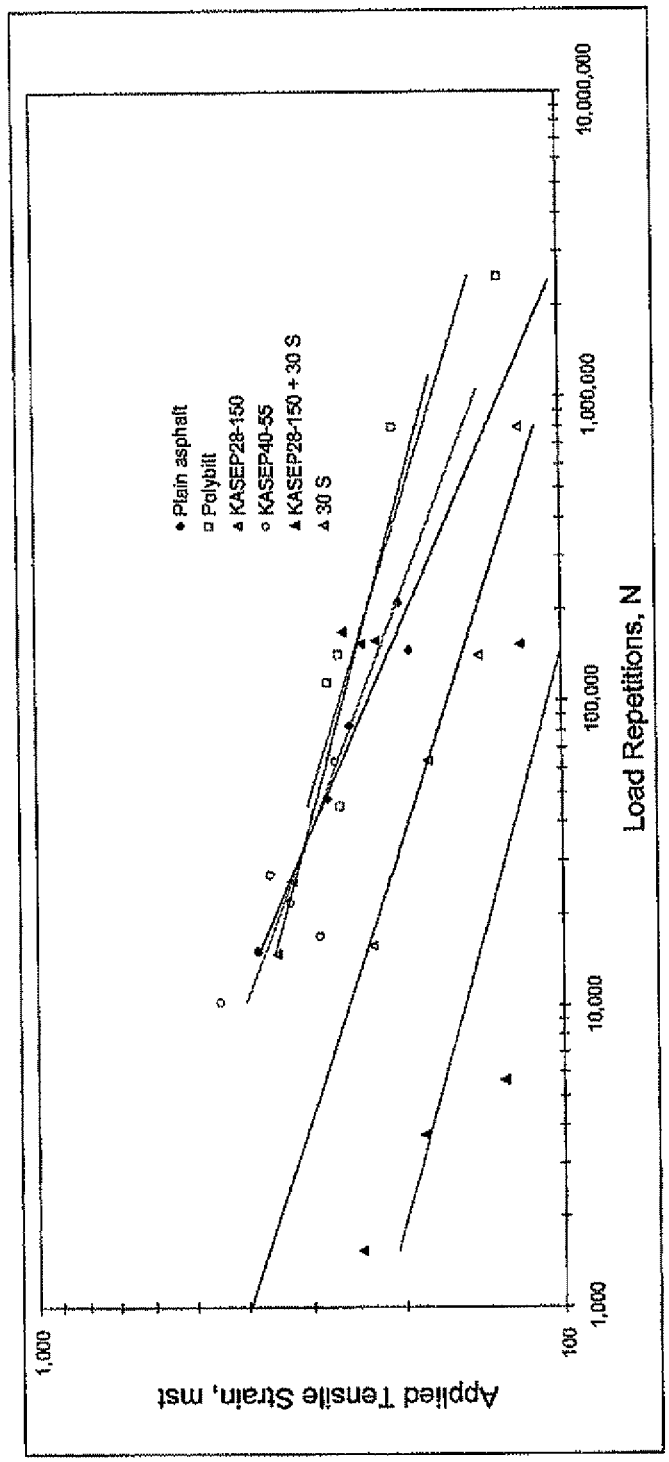
FIG. 7 shows the relationship between applied tensile strain and fatigue of tested mixes.

In an exemplary embodiment, selected plain and modified asphalt mixes were evaluated for rutting resistance using the asphalt pavement analyzer (APA) at 64° C. Wheel load was set to 100 lb, and wheel pressure was set to 100 psi. Test results are shown in FIG. 6 for the selected mixes. Results indicate that plain asphalt has the highest recorded rutting of 6.5 mm at 8000 load repetitions followed by Polybilt™ mix and 30 wt. % sulfur+70 wt. % asphaltic cement mix (30 wt. % sulfur) with rutting of 5.5 mm. 30 wt. % sulfur+70 wt. % asphaltic cement modified by 4 wt. % KASEP28-150 polymer has the least recorded rutting of 2.2 mm followed by KASEP40-55 modified asphalt with rutting of 3.8 mm and finally KASEP28-150 with rutting of 4.8 mm. FIG. 5 shows a comparison between plain asphalt and KASEP4O-55 tested samples. References to KASEP are the same as to HSMP.

Fatigue Resistance of Resulting Composition

Fatigue measurements can be carried out on field samples using the Asphalt Pavement Analyzer (APA) as a torture test at 20° C. While the APA fatigue test is a torture test, it does provide a relative performance measure. Thus, at equivalent stress levels, i.e., in a stress-controlled experiment, one can expect the HSMP asphalt to outperform conventional mixes.

Tensile Strength Reserve: The tensile strength reserve is the difference between the tensile strength and the temperature induced thermal stress. The smaller the difference, the more likely the pavement is to fail under traffic loading in single event load induced thermal cracking rather than via the traditional fatigue failure. Because the load is superimposed on top of the already existing thermal stresses, it is logical to expect that the temperature at which this phenomena occurs can be at substantially higher temperatures than the critical cracking temperature of a non-loaded specimen (i.e., the BBR failure temperature).

The following description outlines the modeling that can be used to approximate the tensile strength reserve for a 4" pavement. In order to estimate the stresses and strains in the pavement as a function of the air temperature, the temperature dependency of the flexural moduli can be taken into consideration. This can be accomplished by performing rectangular torsion testing on mix slivers at 15°, 20°, 25° and 35° C. respectively. The testing can be carried out at frequencies ranging between 0.1 rad/sec and 100 rad/sec. Subsequently, time temperature superposition can be used to calculate the shift factors and to create a master curve, which can predict the Modulus at 10 Hz, which can be commonly assumed to model traffic loading over a relatively wide range. In this procedure, a reference temperature, $T_{ref}$, can be chosen and the frequency at any temperature T multiplied by a shift factor, $a_T$, to obtain a reduced frequency, $\omega$. If $T_{ref}$ is constant, the reduced frequency $\omega$ can be obtained using the following equation: $\omega = \omega \cdot a_T$.

Performance Grade

The results of performance grade testing is shown in Table 5. Results indicate that HSMP meet the workability requirement since the viscosity at 135° C. is less than the limit of 3000 cP.

TABLE 5

Performance grade of HSMP

| No. | Polymer, Code | Viscosity @ 135° C., cP | Performance Grade (PG) |
|---|---|---|---|
| 1 | KASEP33-400 | 655 | 64-10 |
| 2 | KASEP28-150 | 640 | 70-10 |
| 3 | KASEP30-125 | 637 | 70-10 |
| 4 | KASEP40-55 | 1250 | 76-10 |
| 5 | Polybilt ™ modifier | 950 | 76-10 |

Flexural Fatigue test, AASHTO T-321 (TP8-94) was used for testing fatigue properties of the prepared asphaltic concrete beam samples. Samples were tested in a stress-controlled mode to simulate asphalt pavement thick layer construction used locally. Six samples, at least, were tested under different bending peak to peak stress (κPa). Corresponding peak-to-peak strain×$10^{-6}$ were calculated by the software.

As the asphaltic concrete beam sample is subjected to load repetitions, stiffness reduces rapidly at the start then reaches a constant slope until failure of the beam, which is defined as 40% of initial stiffness. Collected data were analyzed to determine relations between load repetition to failure (N) and applied peak-to-peak stress ($\sigma$) or initial peak-to-peak strain ($\epsilon$). FIG. 6 shows the relation between load repetition (N) and initial strain ($\epsilon$) for the tested mixes. Polybilt™ Bitumen Modifier 101 and KASEP-28-150 modified mixes have the highest fatigue life for a given strain.

Gases Emission

Asphalt was heated first and mixed with sulfur at the required percentages by weight of asphalt. The resulting blend was added to the hot aggregates (1200 gm) and mixed thoroughly at 140° C. Four different asphaltic concrete mixtures were prepared as follows: (1) Plain asphaltic mixture as control mix, (2) 30170 Sulfur asphalt (30 wt. % S), (3) 40160 Sulfur asphalt (40 wt. % S), (4) KASEP28-150, and (5) KASEP40-55.

The prepared mixtures were immediately placed in a 4-liter can with interior bottom and sides lined with cardboard, of 5 mm thickness and the mix was stirred with a spoon. The meter probe was placed 5-10 mm from the mix surface. The measurements were made with removed cover to determine ambient gases emission in open airspace. The gaseous concentrations of sulfur dioxide and hydrogen sulfide were measured using H2S/SO2 analyzer, Model 450i, manufactured by Thermo Electron Corporation, USA. The results of gaseous measurements are tabulated in Table 6. The Threshold Limit Values of Chemical substances and Physical Agents in the Workroom Environment as per American Conference of Governmental Industrial Hygienists are provided in Table 7 for ready reference.

It was found that in the plain asphaltic concrete blend (Control mix) at 140° C. the gaseous emission was not noticeable as indicated in Table 7. In the asphaltic concrete mixtures prepared using KASEP polymers. It was found that in an open space and at 140° C. the average concentration of $SO_2$ (sulfur dioxide) was in the order of 0.1 to 0.13 ppm, which does not exceed the permissible limit of sulfur dioxide (2.0 ppm) as per Table 4 as compared to 30170 sulfur asphalt (30 wt. % S) and 40160 sulfur asphalt (40 wt. % S) mixes which has an $SO_2$ concentration of 1.1 to 1.8 ppm. Similarly, the emission of H2S gas was in the order of 0.48 to 1.08 ppm as compared to 2.9 to 3.3 ppm as given by sulfur mixes, which does not exceed the permissible limits. It may be noted that although the sample and experiment is limited in size compared to the actual field construction, it still does not completely simulate the conditions in actual practice, where the mixing will be carried out in an open space with much easier dilution of the emission gases from the source into nearby environment.

TABLE 6

Summary Of Environmental Pollution Test Results.

| Blend Type | Temperature (°) | Ambient Gas Emission (ppm) | |
|---|---|---|---|
| | | $H_2S$ | $SO_2$ |
| Control Mix | Minimum | 0.02 | 0.05 |
| | Average | 0.11 | 0.03 |
| | Maximum | 0.23 | 0.1 |
| 30 wt. % S | Minimum | 0.490 | 0.14 |
| | Average | 1.780 | 0.71 |
| | Maximum | 2.940 | 1.1 |
| 40 wt. % S | Minimum | 0.51 | 0.12 |
| | Average | 1.95 | 0.74 |
| | Maximum | 3.30 | 1.8 |
| KASEP28-150 | Minimum | 0.1 | 0.03 |
| | Average | 0.23 | 0.06 |
| | Maximum | 0.48 | 0.13 |
| KASEP40-55 | Minimum | 0.07 | 0.06 |
| | Average | 0.63 | 0.05 |
| | Maximum | 1.08 | 0.1 |

TABLE 7

Industrial Hygiene Standards.

| Pollutant | Average Threshold Concentration | Maximum Short-Term Limit Value |
|---|---|---|
| $H_2S$ | 10 ppm (8 hours) | 15 ppm |
| $SO_2$ | 2 ppm (8 hours) | 5 ppm |
| Sulfur Particulates (insoluble) | No Specification 10 mg/m$^3$ | |

While the invention has been shown in only a few of its forms, it should be apparent to those skilled in the art that it is not so limited but susceptible to various changes without departing from the scope of the invention. Accordingly, it is intended to embrace all such alternatives, modifications, and variations as fall within the spirit and broad scope of the appended claims.

Those skilled in the art will recognize that many changes and modifications may be made to the method of practicing the invention without departing the scope and spirit of the invention. In the drawings and specification, there have been disclosed embodiments of the invention and, although specific terms are employed, they are used in a generic and descriptive sense only and not for the purpose of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification. Furthermore, language referring to order, such as first and second, should be understood in an exemplary sense and not in a limiting sense. For example, it may be recognized by those skilled in the art that certain steps can be combined into a single step.

What is claimed is:

1. An asphaltic concrete mixture with improved properties relative to rutting and emissions, the asphaltic concrete mixture comprising:

(i) a homogeneous sulfur-modified polymer composition having a total amount of sulfur, where the homogenous sulfur-modified polymer composition comprises a homogeneous blend of a sulfur-modified polymer and a free sulfur; and (ii) an asphaltic concrete, where the asphaltic concrete comprises an aggregate and a bitumen;

where the sulfur-modified polymer has a saturated hydrocarbon polymer backbone and has sulfur that is chemically bonded to the saturated hydrocarbon polymer backbone, and where the total amount of sulfur in the homogeneous sulfur-modified polymer composition is equal to the sum of the amounts of the chemically-bonded sulfur and the free sulfur and is in a range of from about 30 wt. % to about 60 wt. % of the homogeneous sulfur-modified polymer composition.

2. The asphaltic concrete mixture of claim 1, where the homogeneous sulfur-modified polymer composition is present in the asphaltic concrete mixture in a range of from about 4 wt. % to about 6 wt. % of the mixture.

3. The asphaltic concrete mixture of claim 1, wherein the asphaltic concrete comprises about 95 parts by weight aggregate and 5 parts by weight bitumen.

4. The asphaltic concrete mixture of claim 1, where the asphaltic concrete mixture has a rutting deformation of less than about 10 mm after 20,000 cycles based on a wheel load of about 100 lb. and a wheel pressure of about 100 psi.

5. The asphaltic concrete mixture of claim 1 having a performance grade viscosity of less than about 1300 cP at 135° C.

6. The asphaltic concrete mixture of claim 1 having a sulfur dioxide emission rate of less than about 0.20 ppm in a hot-mix asphalt batch.

7. The asphaltic concrete mixture of claim 1 having a hydrogen sulfide emission rate of less than about 1.30 ppm in a hot-mix asphalt batch.

8. The asphaltic concrete mixture of claim 1 where the total amount of sulfur in the homogeneous sulfur-modified polymer composition is in a range of from about 40 wt. % to about 60 wt. % of the homogeneous sulfur-modified polymer composition.

9. The asphaltic concrete mixture of claim 1 where the total amount of sulfur in the homogeneous sulfur-modified polymer composition is in a range of from about 50 wt. % to about 60 wt. % of the homogeneous sulfur-modified polymer composition.

10. The asphaltic concrete mixture of claim 1 where the amount of chemically-bonded sulfur is in a range of from about 20 wt. % to about 45 wt. % of the homogeneous sulfur-modified polymer composition.

11. The asphaltic concrete mixture of claim 1 where the amount of chemically-bonded sulfur is in a range of from about 30 wt. % to about 45 wt. % of the homogeneous sulfur-modified polymer composition.

12. The asphaltic concrete mixture of claim 1 where the total amount of sulfur in the homogeneous sulfur-modified polymer composition is about 50 wt. % and where the amount of chemically-bonded sulfur is in a range of from about 38 wt. % to about 42 wt. % of the homogeneous sulfur-modified polymer composition.

13. The asphaltic concrete mixture of claim 1 where the total amount of sulfur in the homogeneous sulfur-modified polymer composition is about 60 wt. % and where the amount of chemically-bonded sulfur is in a range of from about 42 wt. % to about 44 wt. % of the homogeneous sulfur-modified polymer composition.

14. The asphaltic concrete mixture of claim 1 having a performance grade viscosity in a range of from about 635 cP to about 1300 cP at 135° C.

15. The asphaltic concrete mixture of claim 1 where the sulfur-modified polymer has a melting temperature that is less than 145° C.

16. The asphaltic concrete mixture of claim 1 where the asphaltic concrete mixture has a rutting deformation of less than about 5.0 mm after 8,000 cycles using an asphalt pavement analyzer at 64° C. based on a wheel load of about 100 lb. and a wheel pressure of about 100 psi.

* * * * *

UNITED STATES PATENT AND TRADEMARK OFFICE
CERTIFICATE OF CORRECTION

PATENT NO.      : 9,012,542 B2
APPLICATION NO. : 12/748939
DATED           : April 21, 2015
INVENTOR(S)     : Hussein et al.

It is certified that error appears in the above-identified patent and that said Letters Patent is hereby corrected as shown below:

On the Title Page, Item (73) Assignee appears as "Saudi Arabian Oil Company, Dhahran (SA)" and should read --Saudi Arabian Oil Company, Dhahran (SA); King Fahd University of Petroleum and Minerals, Dhahran (SA)--.

Signed and Sealed this
Fifteenth Day of December, 2015

Michelle K. Lee
*Director of the United States Patent and Trademark Office*